I. C. BRICKEY.
ATTACHMENT FOR VEHICLE TONGUES.
APPLICATION FILED JUNE 13, 1914.
1,125,455. Patented Jan. 19, 1915.
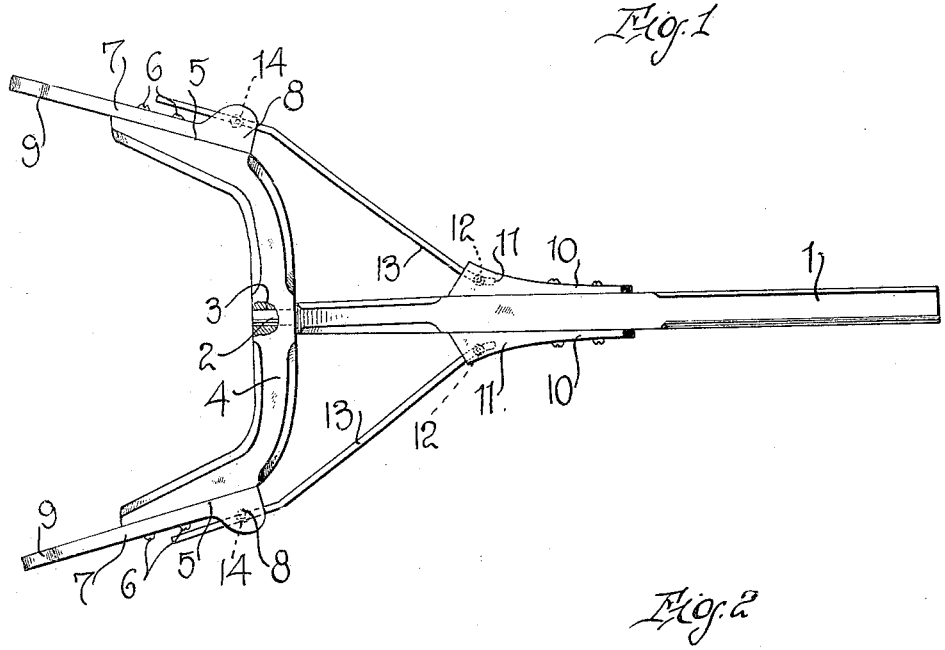
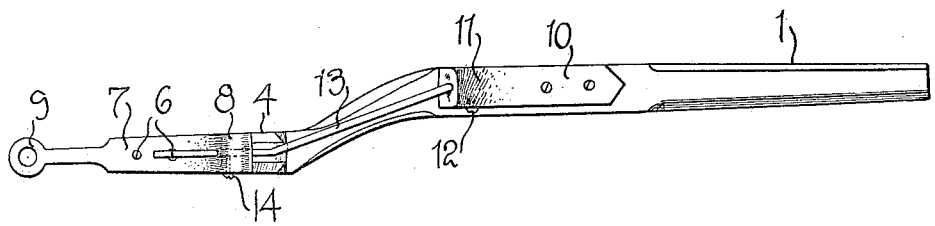
I. C. BRICKEY, Inventor
By Watson E. Coleman, Attorney

UNITED STATES PATENT OFFICE.

IRA C. BRICKEY, OF MORRILLTON, ARKANSAS.

ATTACHMENT FOR VEHICLE-TONGUES.

1,125,455.

Specification of Letters Patent. Patented Jan. 19, 1915.

Application filed June 13, 1914. Serial No. 844,944.

*To all whom it may concern:*

Be it known that I, IRA C. BRICKEY, citizen of the United States, residing at Morrillton, in the county of Conway and State of Arkansas, have invented certain new and useful Improvements in Attachments for Vehicle-Tongues, of which the following is a specification, reference being had to the accompanying drawings.

This invention relates to vehicle tongues, and particularly to an attachment for a buggy tongue or the like, by means of which the tongue may be detachably connected to the curved bar which is pivotally connected to the axle of the buggy.

An object of this invention is the provision of a vehicle tongue which is provided with a reduced extension at its rear end for slidable engagement in a central opening in a curved yoke bar, brace rods being detachably secured in sockets carried on the opposite sides of the tongue, the rear ends of the brace rods being adjustably mounted in sleeves connected to the outer faces of the opposite ends of the yoke bar, whereby the tongue is rigidly braced and is quickly detachable from the curved bar.

A further object of this invention is the provision of a tongue which is connected at its rear end in an opening at a point intermediate of the ends of a curved yoke bar, the opposite ends of the bar extending rearwardly and diverging outwardly, the tongue having sockets connected to its opposite sides in which the forward ends of brace bars are secured, and the rearwardly diverging ends of the curved bar carrying sleeves which are provided with rearward extensions having eyes at their extremities for engagement with the coupling bolts of the vehicle, the sleeves being adapted for adjustment along the rearwardly extending ends of the curved bar, whereby the tongue may be connected to vehicles of various widths, and the rear ends of the brace rods being fastened in the sleeves on the ends of the curved bar to rigidly brace the curved bar and tongue when connected.

With these and other objects in view, my invention consists in the novel construction, combination and arrangement of parts to be hereinafter more fully described, claimed, and illustrated in the accompanying drawing, in which, Figure 1 is a top plan view of my device; and Fig. 2 is a side elevational view thereof.

Referring more particularly to the drawing, the numeral 1 designates a tongue which is provided with a reduced extension 2 at its rear end for engagement in an opening 3 in a transversely curved yoke bar 4. The opposite ends of the yoke bar extend rearwardly and diverge outwardly, and the outer faces of the rearwardly extending ends of the bar are flattened as at 5. Secured against the flattened faces of the ends of the curved bar by screws 6 or other suitable fastening devices, are the rearwardly projecting extensions 7 of sleeves 8, the inner extremities of the extensions projecting rearwardly of the extremities of the ends of the bar and being formed with eyes 9 for engagement with the couplings of the vehicle. Secured to the opposite sides of the tongue adjacent to the curved bar are the forwardly projecting extensions 10 of the sockets 11, the upper faces of the sockets and their extensions being disposed flush with the upper face of the tongue, whereby a wider surface for a doubletree (not shown) to rest upon, is provided. Secured by set screws 12 at their forward ends in the sockets 11 are brace rods 13, the rear ends of the brace rods being passed through the sleeves 8 and secured in adjusted position therein by the set screws 14.

In the practical use of my device, when it is desired to secure the tongue to the axle of a vehicle, the extensions of the sleeves 8 are secured to the flattened sides of the ends of the curved bar so that the eyes 9 are the desired distance apart, whereupon the eyes are connected to the couplings (not shown) on the axle of the vehicle, and the reduced extension 2 of the tongue is disposed within the opening in the bar intermediate of its ends, and the brace rods 13 which are secured at their forward ends in the sockets 11 are connected at their rear ends in the sleeves by the set screws 14. It will be seen that the sockets increase the width of the bearing surface for a doubletree, and that the tongue which is simple and inexpensive in construction is adapted for adjustment to suit the width of any vehicle.

Having thus fully described my invention, what I desire to claim and secure by Letters Patent, is:—

The combination with a tongue, of a curved bar having rearwardly diverging ends connected intermediate of its ends to the rear end of the tongue, sockets secured to the opposite side faces of the tongue, rearwardly diverging brace rods connected at their forward ends in said sockets, rearwardly diverging sleeves arranged against the outer faces of the opposite ends of the bar to slidably receive the rear ends of said brace rods, said sleeves having rearwardly projecting extensions which extend beyond the ends of the bar, the projecting extremities of the extensions being provided with eyes whereby the tongue may be connected to a vehicle, means for securing said sleeves in any desired position with relation to the diverging ends of the bar whereby the distance between said eyes may be adjusted, and means carried by the sleeves for frictional engagement with the rear ends of the brace rods to hold the same in their bracing relation with the tongue and bar.

In testimony whereof I hereunto affix my signature in the presence of two witnesses.

IRA C. BRICKEY.

Witnesses:
R. J. ORRER,
M. ISOM.

Copies of this patent may be obtained for five cents each, by addressing the "Commissioner of Patents, Washington, D. C."